Sept. 26, 1967  TAMOTSU OKADA  3,343,677
SEWAGE TREATMENT PLANT
Filed June 14, 1965
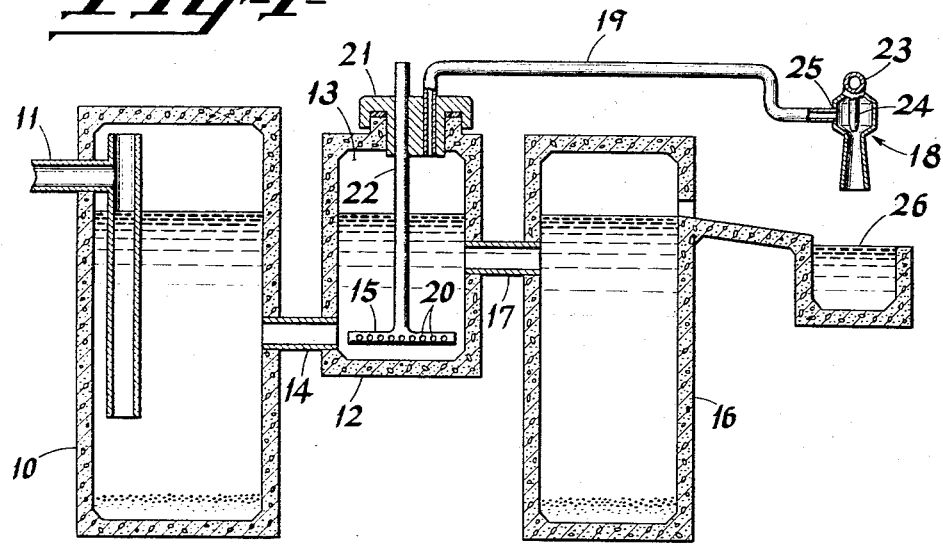
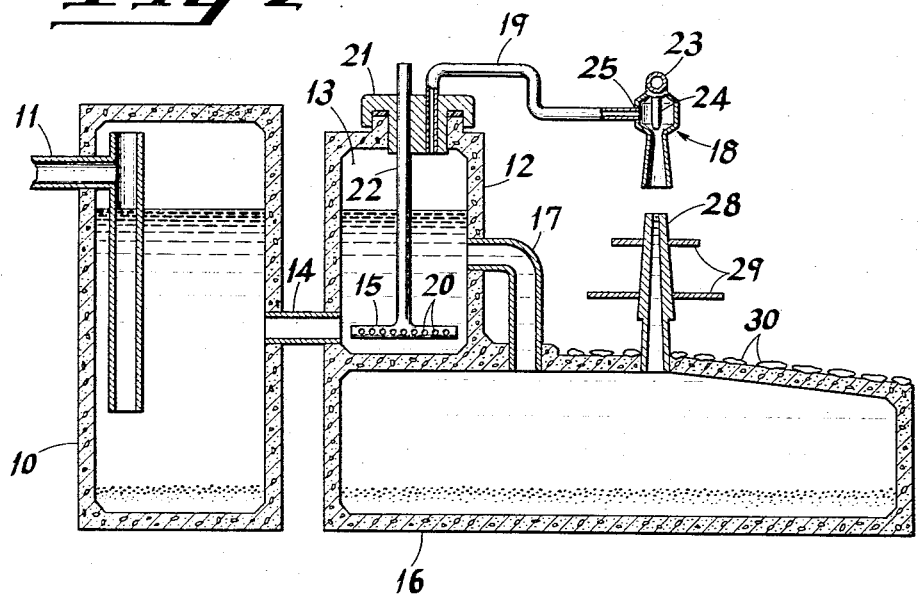
INVENTOR.
TAMOTSU OKADA
BY Jacobi & Davidson United States Patent Office 3,343,677
Patented Sept. 26, 1967

3,343,677
SEWAGE TREATMENT PLANT
Tamotsu Okada, 9 Umegae-cho 1, Gifu, Japan
Filed June 14, 1965, Ser. No. 463,803
6 Claims. (Cl. 210—151)

ABSTRACT OF THE DISCLOSURE

A sewage treatment plant having a closed aeration chamber with a space communicating with the suction opening of a jet pump means. The jet pump means dilutes the effluent from the sewage plant while simultaneously drawing fresh air into the aeration chamber where the sewage is aerated and oxidized with bubbles of air.

This invention relates to a sewage treatment plant and particularly to an improved apparatus for treating domestic sewage.

Household sewage, in most modern cities, is treated in a municipal plant. However some houses, e.g. houses in suburbs are not served by sewers for conveying raw sewage to the point of disposal at municipal plants. Therefore, there are still great demands for a small plant for treating the household sewage at each house.

Conventional plants often are large and expensive to construct, usually requiring a large floor space and a drainage pump. The sewage is passed through two or more large chambers, and a separated effluent is pumped out of the system. It is reported, however, that the conventional plants cannot dispose of the sewage sufficiently in sanitation. Then, the conventional plants have the objectionable characteristic that the separated effluent should be subjected to further treatment prior to its discharging to a stream or lake.

The primary object of the present invention is the provision of an apparatus for treating sewage at such a place where the underground conduits for separate sewage are not constructed.

The sewage treatment plant of the invention is a simple apparatus that contains no moving mechanical parts, such as a blower, agitator or drainage pump. The apparatus of the present invention can handle and treat the sewage rapidly and completely. The sewage which is treated by the apparatus of the invention, is so clear that it can discharge directly to a stream, ditch, storm water drain, lake or sea without injury to health and welfare of mankind.

The present process and apparatus for the treatment of sewage are characterized by the fact that the separated effluent is diluted with a clear water to aid in its oxidation and purification, while the fluid energy for discharging this water causes to add air to the sewage to impel its aeration and oxidation.

Other objects and advantages of the invention will be apparent from the following description of preferred forms of the invention, reference being made to the accompanying drawings wherein like numerals refer to like figures:

FIG. 1 is a side sectional view, somewhat diagrammatic, of a sewage treatment apparatus embodying the invention; and FIG. 2 is an illustration, somewhat diagrammatic, of an alternate embodiment of the invention.

In the preferred forms of the invention the apparatus comprises a sewage tank 10, a sewage inlet 11 to the sewage tank 10, an aeration chamber 12 having at the upper portion thereof an air-space 13, a conduit 14 carrying partially treated sewage from the sewage tank 10 to the aeration chamber 12, an aerator 15 positioned within the aeration chamber 12, a sedimentation chamber 16, a conduit 17 carrying aerated sewage from the aeration chamber 12 to the sedimentation chamber 16, a jet pump or injector 18 for injecting clear water of high pressure into the effluent from the sedimentation chamber 16 and an air pipe 19 communicating the air-space 13 of the aeration chamber 12 and the injector 18.

The sewage tank 10 where the raw sewage from the sewage inlet 11 is held for a period of time, is a chamber for primary treatment in a broad sense, such as clarification, sedimentation or digestion of the raw sewage. The sewage inlet 11 is preferably opened into the tank 10 well below the liquid surface whereby the setting of the heavier solids is promoted while the lighter materials travel to the aeration chamber 12 through the conduit 14. The conduit 14 is arranged not to collect scum.

The aerator 15 may be of any desirable size and form, and as a typical illustration may be of a manifold or manifolds having many perforations 20, 20. Sponge and other porous materials may be satisfactorily used as the aerator. But the aerator 15 must be positioned near the bottom of the aeration chamber 12.

Extended from the manifold 15 through a cap member 21 of the aeration chamber 12 and opened to the atmosphere, is an air tube 22 which serves to supply fresh air to the aeration chamber 12 as will be explained more fully hereinafter. The air-space 13 is formed above the liquid surface of the aeration chamber 12 as previously described. The cap member 21 acts to close hermetically the aeration chamber 12. The cap member 21 acts also to support an open end of the air pipe 19.

The jet pump or injector 18 includes a water pipe 23, water nozzle 24 and suction opening 25. The other open end of the air pipe 19 is connected to the suction opening 25 of the injector 18. The water pipe 23 is connected to a proper source of clear water, so that this clear water is always and continuously discharged at high pressure from the water nozzle 24.

The volume of discharge of the pressure water is relatively small, viz. for the apparatus for treating the sewage of a family of twenty, it may be about 10 litres per hour.

The pressure water or "motive fluid" in the injector 18, induces the flow of air and causes to pump or suck the air from the air-space 13 of the aeration chamber 12 through the air pipe 19. As a result, fresh air is drawn into chamber 12 through the air tube 22 and discharged in bubbles from the perforated manifold 15, thus the incoming sewage from the primary treatment is agitated in the presence of an ample supply of air in the aeration chamber 12. Thus, the sewage will be aerated and oxidized in the aeration chamber 12 with the bubbles of air.

The aerated sewage, then, passes to the sedimentation chamber 16 where it separates into a clear effluent and activated sludge. The sludge accumulates on the bottom of the chamber 16.

The effluent from the sedimentation chamber 16 passes to a place where the sewage is diluted with the clear water from the injector 18. In FIG. 1, there is formed a pool 26 of effluent prior to its discharge from the system. The clear water from the injector 18 is injected at high pressure into the pool 26 of effluent. The injection of pressure water which is mingled with the air from the air-space 13 of the aeration chamber 12, produces bubbles of air and dissolves oxygen in the effluent and causes to subject the sewage to the last treatment by aerobic process. Thus, the sewage is made clear and reasonably purified effluent. This purified effluent may be discharged directly to a stream, ditch, storm water drain, lake or sea.

A modification of the present invention is shown in FIG. 2, wherein the last treatment of the sewage is effectively accomplished by a specially designed device by aerobic process. That is to say, the effluent from the sedimentation chamber 16 overflows from a pipe 28. The jet nozzle of the injector 18 is directed toward the port of the overflow pipe 28. This overflow pipe 28 is provided with two or more stepped tables 29, 29 in order to prolong the time for exposing the effluent to air. The overflow pipe 28 preferably stands on an oxidation bed which is paved with stones 30, 30. These stones have a film, respectively, of bacterial slime and other organisms on the surface thereof.

In the apparatus of FIG. 2, purification of the sewage is completely accomplished during its trickling down through the oxidation bed. It should be understood that the discharge of liquor from the overflow pipe 28 is governed by the height of the port of the overflow pipe 28 relative to the head of liquor in the chamber 12. Since the effluent from the plant overflows through the port whose diameter is relatively small, the velocity of flow of liquid is maintained at a low rate best suited for the sedimentation process even if a large volume of sewage is introduced into the plant with a rush.

Obviously many modifications and variations of the present invention are possible in the light of the above teachings. It is therefore to be understood that within the scope of the appended claims the invention may be practiced otherwise than as specifically described. For instance, it is possible to construct the apparatus as one tank partitioned into three chambers of sewage tank 10, aeration chamber 12 and sedimentation chamber 16, so as to compact it.

What I claim is:

1. A sewage treatment plant comprising a sewage tank adapted to hold raw sewage for a period of time, a hermetically closed aeration chamber means communicating with said sewage tank to receive effluent therefrom, aerator means disposed in said aeration chamber means beneath the surface of said effluent, said aerator means being in communication with the atmosphere, said aeration chamber means having a space between the top thereof and the surface of said effluent therein, a sedimentation chamber means communicating with said aeration chamber means to receive aerated effluent therefrom, said aerated effluent settling in said sedimentation chamber into clarified liquor and activated sludge, overflow means operatively associated with said sedimentation chamber means to expose at least a portion of said clarified liquor to the atmosphere, and jet pump means adapted to be connected to a source of clear high pressure water, said jet pump means including a water discharge nozzle positioned to discharge into said overflow means and a suction conduit communicating with said space in said aeration chamber means, said jet pump means being operative to draw the air from said space to thus cause said aerator means to draw in atmospheric air to aerate said effluent and said jet pump means simultaneously being operative to discharge clear high pressure water into said clarified liquor in said overflow means.

2. A sewage treatment plant as defined in claim 1 wherein said aerator means includes a manifold means arranged horizontally near the bottom of said aeration chamber means, said manifold means having perforations for producing very fine bubbles and having pipe means communicating with the atmosphere for supplying fresh air to said manifold means.

3. A sewage treatment plant as defined in claim 1 wherein said overflow means includes an upstanding pipe projecting from said sedimentation chamber means, said upstanding pipe being aligned with said water discharge nozzle.

4. A sewage treatment plant as defined in claim 3 wherein said overflow pipe includes outwardly directed flange means so that the clarified liquor discharging through said overflow pipe trickles around said flange means thereby exposing the liquor to the air for oxidation.

5. A sewage treatment plant as defined in claim 3, further including an oxidation bed at least partially surrounding said overflow pipe so that the discharging liquor from said overflow pipe trickles across said oxidation bed.

6. A sewage treatment plant as defined in claim 1 further including a first conduit means having an inlet end communicating with said sewage tank and a discharge end communicating with said aeration chamber means, and a second conduit means having an inlet end communicating with said aeration chamber means and a discharge end communicating with said sedimentation chamber means, each of said conduit means having its inlet end spaced substantially above the bottom of the chamber from which it is collecting liquid to thereby prevent any scum from being transferred through said conduit means.

References Cited

UNITED STATES PATENTS

| | | | |
|---|---|---|---|
| 1,622,155 | 3/1927 | Kobiolke | 230—92 |
| 2,380,465 | 7/1945 | Proudman | 210—199 |
| 2,394,413 | 2/1946 | Walker | 210—195 X |
| 2,770,365 | 11/1956 | Welsch | 210—221 X |

REUBEN FRIEDMAN, *Primary Examiner.*

J. L. De CESARE, *Assistant Examiner.*